June 1, 1926.

C. E. LAUTERBACH

EDUCATIONAL TEST SHEET

Filed Sept. 29, 1925     2 Sheets-Sheet 1

June 1, 1926.  
C. E. LAUTERBACH  
EDUCATIONAL TEST SHEET  
Filed Sept. 29, 1925  
1,586,628  
2 Sheets-Sheet 2
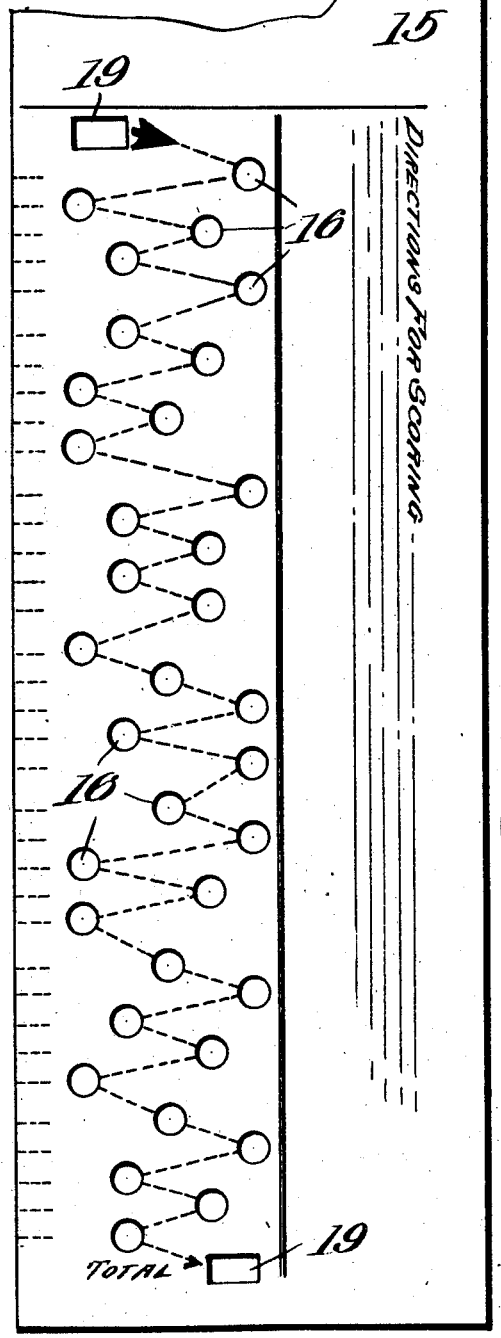
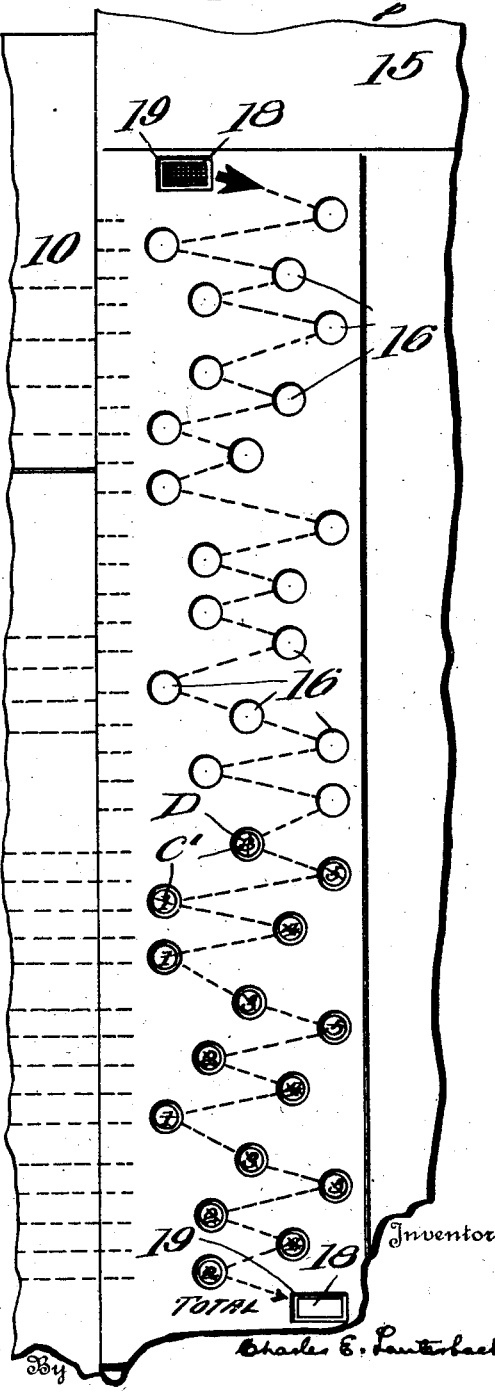

Patented June 1, 1926.

1,586,628

UNITED STATES PATENT OFFICE.

CHARLES E. LAUTERBACH, OF MORGANTOWN, WEST VIRGINIA.

EDUCATIONAL TEST SHEET.

Application filed September 29, 1925. Serial No. 59,352.

This invention is a self-scoring educational test device.

One of the objects of the invention is to provide a method which will train pupils to quickly spot or locate any inaccuracies which may appear in a previously prepared test lesson, in which accurate data is displayed in association with more or less inaccurate data. A further object is to provide an educational test method of the character mentioned in which the scoring of the test may be done by the pupils themselves so that when the test papers are collected by the instructor the test has been scored and the standing of the respective pupils already determined.

The invention will be hereinafter fully set forth and particularly pointed out in the claims.

In the accompanying drawings:—

Figure 1 is a plan view illustrating one page of an educational sheet constructed in accordance with the invention. Figure 2 is a similar view illustrating the stencil used in determining the rating of the pupil. Figure 3 is a view showing the method of using the stencil.

Referring to the drawing, 10 designates one page of an educational sheet which for purposes of illustration contains a spelling lesson. Said sheet 10 is in the form of a blank which contains a space for the pupil's name, and such other data relating to the pupil as may be desirable. Below the heading is located a plurality of sets A, of items B, each set of items being in the form of words forming the subject-matter for a spelling lesson. Each word or item B is associated with an identifying character C, numbers having been selected for purposes of illustration, although it is obvious that any other form of identifying character may be employed.

To the right of the respective series of items is arranged a corresponding number of sets A', of spaces D, each space corresponding to the position of an item B, in the respective lines or sets A, and each space being also associated with consecutive identifying characters C', which are duplicates of the identifying characters C, for the items B, and which are positioned in the same sequence as the said characters C.

It is also preferred, although not necessary, to place at the top of the page a space E for indicating the total score made by the pupil in marking the lesson.

Associated with the sheet 10 is a stencil 15, which is provided with a series of holes 16. Said holes 16 are positioned to register with those spaces D which contain the identifying characters for the inaccurate data in the respective items. For instance, the misspelled word in the first line is the third word. The stencil accordingly has an opening 16 which when the stencil is properly positioned, will expose the third space D. In other words the holes 16 register with the spaces C which in turn correspond with the numbers of the misspelled words. For the purpose of assisting in the proper positioning of the stencil, the sheet 10 is provided with locating marks 18, and the stencil is provided with openings 19 positioned to register with said marks.

In practice, the pupils of a class all receive corresponding sheets 10, and the class is then instructed in the method to be followed in conducting the test. For instance attention is called to the misspelled word in the first line of example X, and they are told to place a cross-mark in the circle D which corresponds to the number of the said word. This instruction is repeated until it is clear that the pupils understand what is expected of them. When the nature of the exercise is thoroughly understood, a starting signal is given, and each pupil then starts to correct his own paper, by placing cross-marks in these circles D, which correspond to the words which he considers are incorrect. For instance, taking the first set of items B, the third word "can" is misspelled. The pupil if he discovers the mistake places a cross-mark in the space numbered 3, to the right of the line containing the word. The proper space is readily determined because it contains a duplicate of the identifying mark of the misspelled word and in identically the same position. The pupil continues selecting the misspelled words and placing a cross mark in the respective circles which corresponds to said words.

When the test is finished the pupils exchange papers and write their names on the blanks in the spaces marked scorer. Stencils 15 may then be distributed if this has not already been done previous to starting the test, and the pupils instructed how to use them. In use, each stencil 15 is positioned so that the openings 19 thereof register with the marks 18 of a text sheet, and when said stencil is properly positioned the openings 16 thereof will register with and expose the spaces D which correspond to the misspelled words of the test. The scorer is thus enabled to quickly count the number of cross-marks visible, and thereby determine the score of the pupil whose paper he is marking. At the end of the marking the papers may be turned in and tabulated in any desired manner.

The advantages of the invention will be readily apparent to those skilled in the art to which it appertains. An important advantage is that the time heretofore spent by an instructor in tedious scoring can now be devoted to the tabulation of data and the interpretation of results. The self-scoring test required no more time for its administration than the old type of test and has the important advantage that when the test papers are collected the test will have been scored. Because of simplicity of administration and because they are self-scoring, these tests afford an efficient method of frequently checking pupil progress, and it is no longer necessary to restrict the program to one or two tests in a school year.

It is to be understood that although the invention is illustrated and described as applied to a spelling lesson, it is not limited thereto, but is equally applicable to any other educational subject in which inaccurate data may be located and its position indicated by identifying indicia, and the test scored in the same manner as that hereinabove described.

Having thus explained the nature of the invention and described an operative manner of constructing and using the same, although without attempting to set forth all of the forms in which it may be made, or all of the forms of its use, what is claimed is:—

1. An educational device of the character described comprising a sheet containing a plurality of sets of data, each set being made up of a plurality of items, one or more of which is inaccurate, each item being associated with an identifying character, said sheet also containing a scoring diagram consisting of a plurality of sets of spaces, each space being associated with identifying characters which are duplicates of the first mentioned identifying characters and positioned in the same sequence, whereby the pupil may indicate the respective inaccuracies in the respective corresponding spaces, and means for guiding the pupil in making the indications of said inaccuracies.

2. An educational device of the character described comprising a sheet containing a plurality of sets of data, each set being made up of a plurality of items, one or more of which is inaccurate, each item being associated with an identifying character, said sheet also containing a scoring diagram consisting of a plurality of sets of spaces, each of which is associated with identifying characters which are duplicates of the first mentioned identifying characters, and are positioned in the same sequence, whereby the pupil may indicate the respective inaccuracies in the respective corresponding spaces, and a stencil containing holes marked to register with those spaces which correspond to the positions of the inaccurate items, whereby the total number of correct markings is indicated when said stencil is placed over said spaces.

3. An educational device of the character described comprising a sheet containing a plurality of sets of data, each set being made up of a plurality of items, one or more of which is inaccurate, each item being associated with an identifying character said sheet also containing a scoring diagram consisting of a plurality of sets of spaces, each of which is associated with identifying characters which are duplicates of the first mentioned identifying characters and are positioned in the same sequence, whereby the pupil may indicate the respective inaccuracies in the respective corresponding spaces, a stencil containing holes marked to register with those spaces which correspond to the positions of the inaccurate items, whereby the total number of correct markings is indicated when said stencil is placed over said spaces, said sheet and said stencil having complemental means serving as an index for the proper positioning of the stencil on the sheet.

In testimony whereof I have hereunto set my hand.

CHARLES E. LAUTERBACH.